US008154525B2

(12) United States Patent
Katsurahira (10) Patent No.: US 8,154,525 B2
(45) Date of Patent: Apr. 10, 2012

(54) POSITION DETECTING DEVICE AND POSITION DETECTING METHOD

(75) Inventor: Yuji Katsurahira, Kazo (JP)

(73) Assignee: Wacom Co., Ltd., Saitama (JP)

( * ) Notice: Subject to any disclaimer, the term of this patent is extended or adjusted under 35 U.S.C. 154(b) by 863 days.

(21) Appl. No.: 12/206,657

(22) Filed: Sep. 8, 2008

(65) Prior Publication Data

US 2009/0065269 A1    Mar. 12, 2009

(30) Foreign Application Priority Data

Sep. 10, 2007  (JP) ................. 2007-234518

(51) Int. Cl.
G06F 3/041 (2006.01)
G06F 3/033 (2006.01)
(52) U.S. Cl. ............. 345/173; 345/179; 178/18.01; 178/19.01; 178/19.06
(58) Field of Classification Search .... 178/18.01–20.04; 345/157, 173–179
See application file for complete search history.

(56) References Cited

U.S. PATENT DOCUMENTS

| | | | | | |
|---|---|---|---|---|---|
| 4,368,351 A | * | 1/1983 | Zimmer | ............... | 178/18.07 |
| 4,552,991 A | * | 11/1985 | Hulls | ............... | 178/20.04 |
| 4,646,087 A | * | 2/1987 | Schumann | ............... | 340/870.31 |
| 4,818,851 A | * | 4/1989 | Kimura | ............... | 235/472.01 |
| 4,885,798 A | * | 12/1989 | Jinich et al. | ............... | 455/504 |
| 5,591,945 A | * | 1/1997 | Kent | ............... | 178/18.04 |
| 5,679,930 A | | 10/1997 | Katsurahira | | |
| 5,682,019 A | * | 10/1997 | Katsurahira et al. | ....... | 178/18.07 |
| 5,714,984 A | * | 2/1998 | Fukuzaki et al. | ............ | 345/174 |
| 5,898,136 A | * | 4/1999 | Katsurahira | ............... | 178/18.01 |
| 6,888,538 B2 | * | 5/2005 | Ely et al. | ............... | 345/173 |
| 7,005,843 B2 | | 2/2006 | Matsubara | | |
| 2004/0095333 A1 | | 5/2004 | Morag et al. | | |
| 2004/0233178 A1 | | 11/2004 | Silk et al. | | |
| 2005/0104865 A1 | | 5/2005 | Oda et al. | | |
| 2007/0085836 A1 | * | 4/2007 | Ely | ............... | 345/173 |
| 2008/0149402 A1 | * | 6/2008 | Vos | ............... | 178/19.01 |
| 2010/0321338 A1 | * | 12/2010 | Ely | ............... | 345/174 |

FOREIGN PATENT DOCUMENTS

| | | |
|---|---|---|
| EP | 0 856 809 A2 | 8/1998 |
| EP | 1 837 744 A2 | 9/2007 |
| JP | 63070326 A | 3/1988 |
| JP | 5088811 A | 4/1993 |
| JP | 7175572 A | 7/1995 |
| JP | 2004318844 A | 11/2004 |

(Continued)

Primary Examiner — Alexander Eisen
Assistant Examiner — Sanjiv D Patel
(74) Attorney, Agent, or Firm — Seed IP Law Group PLLC (57) ABSTRACT

An excitation coil (19) surrounding the periphery of the position detecting area is connected to an oscillating circuit (21), which oscillates at a frequency $f_0$, through a drive circuit (20). A CPU (18) supplies control signals to a selecting circuit (12), a sample-and-hold circuit (16), an A/D conversion circuit (17), and the drive circuit (20). Based on the control signal output from the CPU (18), the drive circuit (20) controls the power of the signal output from the excitation coil (19) to ON or OFF. Further, the strength of the excitation signal supplied from the excitation coil (19) is controlled based on information obtained by analyzing a signal received from a position indicator (40), such as the position indicated by the position indicator on the position detecting area and/or a strength of the signal received from the position indicator.

21 Claims, 5 Drawing Sheets

FOREIGN PATENT DOCUMENTS

| | | |
|---|---|---|
| JP | 2005-100105 A | 4/2005 |
| JP | 2007-47918 A | 2/2007 |
| JP | 2007-257359 A | 4/2007 |
| WO | 2006/032294 A1 | 3/2006 |

* cited by examiner

POSITION DETECTING DEVICE AND POSITION DETECTING METHOD

CROSS-REFERENCES TO RELATED APPLICATIONS

The present application claims priority under 35 U.S.C.§119 from Japanese Patent Application JP 2007-234518 filed in the Japanese Patent Office on Sep. 10, 2007, the entire contents of which being incorporated herein by reference.

BACKGROUND OF THE INVENTION

1. Field of the Invention

The present invention relates to a position detecting device and a position detecting method for detecting a position indicated by a position indicator, such as a stylus pen.

2. Description of the Related Art

Examples of known position detecting devices are disclosed in Japanese Unexamined Patent Publication No. S63-70326 and Japanese Unexamined Patent Publication No. H07-175572 (corresponding to U.S. Pat. No. 5,679,930, incorporated by reference herein), which have already been put into practical use. With such devices, a position indicated by a position indicator is detected by providing a resonant circuit in the position indicator to transmit/receive electromagnetic waves between the position indicator and a tablet, over which a user moves the position indicator. With some position detecting devices, extremely good operability is achieved by making the position indicator cordless and battery-free.

In some cases, it is desirable to incorporate position detecting technology into a device having a liquid crystal display. By incorporating a position indicator into a handheld stylus pen, a user is able to perform input operations by directly writing with the stylus pen at a desired drawing place on the liquid crystal display screen. The position detecting devices generally include a sensor having a number of coils that transmit and receive signals from the position indicator. In the past, it has not been practical to put the sensor coils (also referred to as a sensor pattern) on a front surface of the liquid crystal display, because the sensor coils are not very transparent.

For this reason, in related apparatuses in which a liquid crystal display device and a position detecting device are integrated, the aforesaid sensor coils are arranged in the rear of the liquid crystal panel. Due to such an arrangement, the once-assembled liquid crystal panel needs to be disassembled for assembling the sensor coils, thereby increasing cost and manufacturing complexity. Furthermore, the liquid crystal panel can not be easily replaced.

Thus, there is an increasingly strong demand for making the sensor coils of the position detecting device transparent so that the coils can be disposed on the front surface of the liquid crystal panel. An ITO film (Indium Tin Oxide film) is widely known as a transparent conductive material for forming the sensor coils. However, since the ITO film has high resistance, if the sensor coils are formed by the ITO film, it will be difficult to transmit sufficient power to the position indicator by using such sensor coils.

To solve such a problem, there is a proposal to provide a transmittance coil for transmitting a drive signal to the position indicator in the periphery of the position detecting area of the position detecting device. For example, it is disclosed in Japanese Unexamined Patent Publication No. H05-88811 (incorporated by reference herein) that a transmittance coil is provided to surround the periphery of the position detecting area of a tablet-like position detecting device.

SUMMARY OF THE INVENTION

According to the art disclosed in Japanese Unexamined Patent Publication No. H05-88811, it is not necessary to install a battery or the like in a pen which serves as the position indicator, and the necessary electrical power can be supplied to the position indicator by the transmittance coil (or the surrounding coil). Further, in this case, since the sensor coils for detecting the position of the position indicator do not have to supply electrical power to the position indicator, the sensor coils can be dedicated for signal reception only. Therefore, it is possible to employ sensor coils formed by the ITO film to obtain a relatively high transparency.

With the aforesaid art, however, if the position detecting area of the position detecting device is relatively large, when the position indicator is located near the center of the position detecting area, the distance between the position indicator and the surrounding coil will become large, and therefore the signal level of the drive signal received from the surrounding coil will become weak. Thus, to receive a strong enough signal even at the center of the position detecting area, it is necessary to increase the power of the drive signal supplied by the surrounding coil. In such a case, battery life will be reduced, especially when the position detecting device is used in a mobile terminal such as a laptop computer.

In view of the above stated problems, it is an object of the present invention to provide a position detecting device in which it is not necessary to build a battery or the like into a pen-like position indicator. Sensor coils provided in a tablet-like position detecting device may be arranged on the front surface of a liquid crystal panel of the type found in a laptop computer or other device. The position detecting device has an increased battery life even when being used in a mobile terminal such as a laptop computer.

A position detecting device according to an aspect of the present invention detects a position indicated by a position indicator on a position detecting area. The position detecting device comprises: an excitation coil arranged to surround a periphery of the position detecting area to supply an excitation signal to the position indicator. The indicated position of the position indicator on the position detecting area is detected from an AC signal transmitted by the position indicator based on the excitation signal supplied from the excitation coil. A controller controls the strength of an excitation signal to be supplied from the excitation coil based on information obtained by analyzing the AC signal received from the position indicator, such as the detected indicated position or strength of the detected AC signal.

A position detecting device according to another aspect of the present invention is also a position detecting device for detecting an indicated position of a position indicator on a position detecting area. The position detecting device comprises: a sensor configured to be arranged on the front surface of a liquid crystal display device to detect the indicated position of the position indicator, the sensor corresponding to the position detecting area; an excitation coil arranged to surround a periphery of the position detecting area to supply driving power to circuitry of the position indicator; and a controller for dynamically controlling the power of a signal to be supplied to the excitation coil according to information obtained by analyzing a signal received from the position indicator, such as the detected position of the position indicator on the position detecting area and/or a signal level of the signal detected by the sensor based on interaction between the position indicator and the sensor.

A position detecting method according to another aspect of the present invention is a method for detecting an indicated position of a position indicator on a position detecting area of a position detecting device. The method comprises: detecting the indicated position of the position indicator on the position detecting area of the position detecting device by supplying an excitation signal to the position indicator with an excitation coil provided to surround a periphery of the position detecting area of the position detecting device and detecting, in the position detecting area, an AC signal transmitted from the position indicator based on the excitation signal supplied from the excitation coil; and controlling a strength of an excitation signal to be supplied from the excitation coil, based on information obtained by analyzing the AC signal received from the position indicator, such as the detected indicated position or strength of the detected AC signal.

A position detecting method according to another aspect of the present invention is also a method for detecting an indicated position of a position indicator on a position detecting area of a position detecting device. The method comprises: detecting the indicated position of the position indicator on the position detecting area of the position detecting device with a sensor that is arranged on a front surface of a liquid crystal display device, the sensor corresponding to the position detecting area; arranging an excitation coil for supplying driving power to circuitry provided in the position indicator in a manner so as to surround a periphery of the position detecting area of the position detecting device; and dynamically controlling power of a signal to be supplied to the excitation coil according to information obtained by analyzing a signal received from the position indicator, such as the detected indicated position of the position indicator on the position detecting area and/or a signal level of a signal detected by the sensor based on interaction between the position indicator and the sensor.

Regarding the position detecting devices and the position detecting methods according to various exemplary embodiments of the present invention, since the output level of the drive signal output from the surrounding coil is controlled according to the indicated position of the position indicator, for example, the power of the drive signal output from the surrounding coil can be optimized, and therefore the power consumption can be decreased. As a result, especially in the case where the present invention is applied to a mobile terminal such as a laptop computer, a battery life of the mobile terminal can be extended.

DETAILED DESCRIPTION OF THE PREFERRED EMBODIMENT(S)

Figure 1:
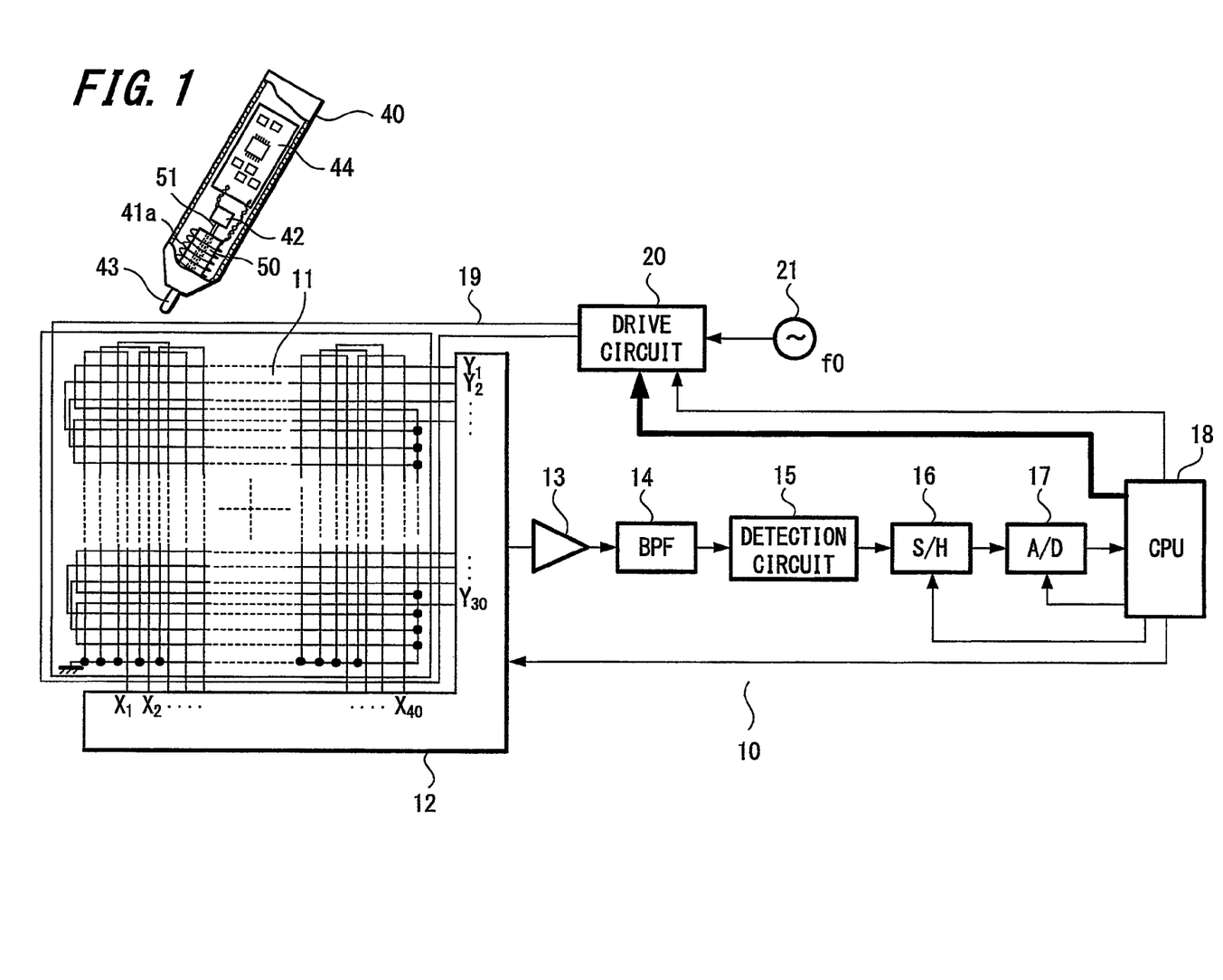
FIG. 1 is a diagram showing the configuration of a tablet as a position detecting device according to one embodiment of the present invention.

Embodiments of the present invention will be described below with reference to the attached drawings. FIG. 1 is a diagram showing a configuration of a tablet used as a position detecting device according to one embodiment of the present invention.

As shown in FIG. 1, a tablet 10 is provided with a sensor including loop coil group 11. The loop coil group 11 has loop coils X1 to X40 and loop coils Y1 to Y30 respectively arranged in an X-axis direction and a Y-axis direction. A position detecting area of the tablet 10 formed by the loop coil group 11 is substantially the same as a display area of a liquid crystal display device (not shown). In other words, the size of the loop coil group 11 and the arrangement pitch of the coils are determined such that the position detecting area substantially corresponds to the display area of the liquid crystal display device.

Each of the loop coils X1 to X40 and loop coils Y1 to Y30 is connected to a selecting circuit 12 so that a desired loop coil can be selected. The loop coil selected by the selecting circuit 12 is connected to an amplifying circuit 13. The amplifying circuit 13 is connected to a band pass filter 14 having a central frequency of $f_0$. The band pass filter 14 is connected to a detection circuit 15. Further, the output of the detection circuit 15 is connected to an input of a sample-and-hold circuit 16. The voltage held by the sample-and-hold circuit 16 is supplied to an A/D conversion circuit (Analog to Digital conversion circuit) 17. The output of the A/D conversion circuit 17 is applied to a CPU (Central Processing Unit) 18. With such a configuration, the position indicated by a position indicator 40, such as a stylus pen, can be detected based on signals generated by the interaction between the position indicator 40 and the loop coils of the tablet 10.

An excitation coil 19 is arranged to surround the periphery of the position detecting area. Although the number of turns of the excitation coil 19 is two in this example, in practice the number of turns is set according to each application, for example, eight to ten turns or more. However, in some configurations, fewer turns may be used. The excitation coil 19 is connected to a drive circuit 20. The drive circuit 20 is connected to an oscillating circuit 21, which oscillates at a frequency $f_0$.

The CPU 18 supplies control signals to the selecting circuit 12, the sample-and-hold circuit 16, the A/D conversion circuit 17 and the drive circuit 20 respectively, according to a set of program instructions. Thus, the CPU 18 controls the operation of the tablet 10 serving as the position detecting device. Based on the control signals supplied from the CPU 18, the drive circuit 20 controls the excitation coil 19 so that the signal output from the excitation coil 19 can be controlled ON or OFF. Further, the drive circuit 20 controls the signal level of the excitation signal to be supplied from the excitation coil 19 in a stepwise manner by using a power-controlling signal composed of a plurality of bits.

Figure 2:
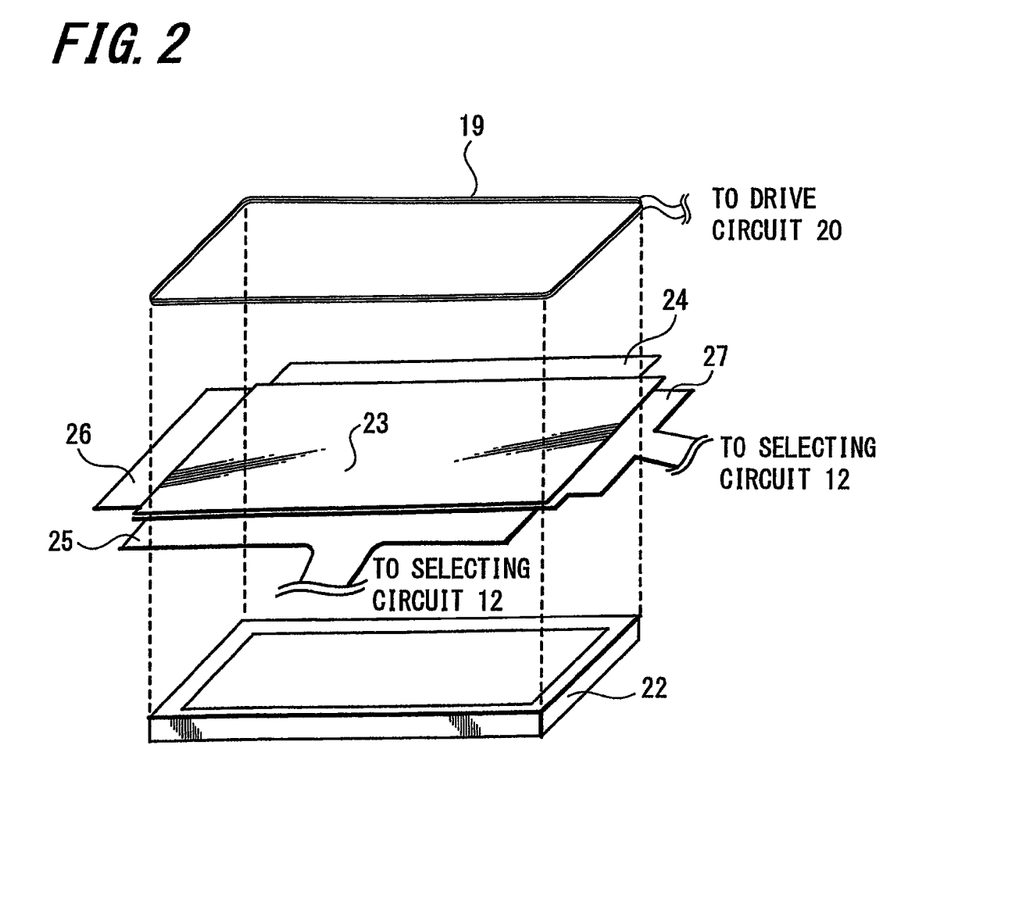
FIG. 2 is an exploded perspective view showing a structure of the position detecting device of FIG. 1.

FIG. 2 shows an exploded view of the structure of the tablet 10. A sensor glass 23 is arranged on a liquid crystal display device 22.

In one embodiment, the sensor glass 23 is formed by laminating two sensor glasses to each other, with each sensor glass having a thickness of about 0.4 mm. Each of the sensor glasses is formed with a pattern of the loop coil group 11 made with an ITO film (Indium Tin Oxide film). In other words, one sensor glass is formed with a pattern of the loop coils X1 to X40 and the other sensor glass is formed with a pattern of the loop coils Y1 to Y30 by means of, for example, etching. Further, a transparent insulating sheet (not shown) is sandwiched between the two sensor glasses in a manner in which the ITO films of the two sensor glasses face each other.

In one embodiment, one end of respective lines forming the loop coils X1 to X40 arranged on the sensor glass 23 are electrically connected, according to a predetermined rule, to a flexible substrate 24 having a polyimide base material. Similarly, the other end of respective lines forming the loop coils X1 to X40 arranged on the sensor glass 23 are electrically connected, according to the predetermined rule, to a flexible substrate 25. Therefore the loop coils, each composed of a pair of lines, are respectively formed. By connecting each of the connecting terminals of the flexible substrate 25 to the selecting circuit 12, a signal generated by the interaction between the position indicator 40 and the loop coils X1 to X40 is output through the selecting circuit 12.

In the same manner, lines forming the loop coils Y1 to Y30 of the sensor glass 23 are connected to flexible substrates 26 and 27 so as to form the loop coils. Further, a signal output through a flexible substrate 27 is supplied to the selecting circuit 12.

Figure 3:
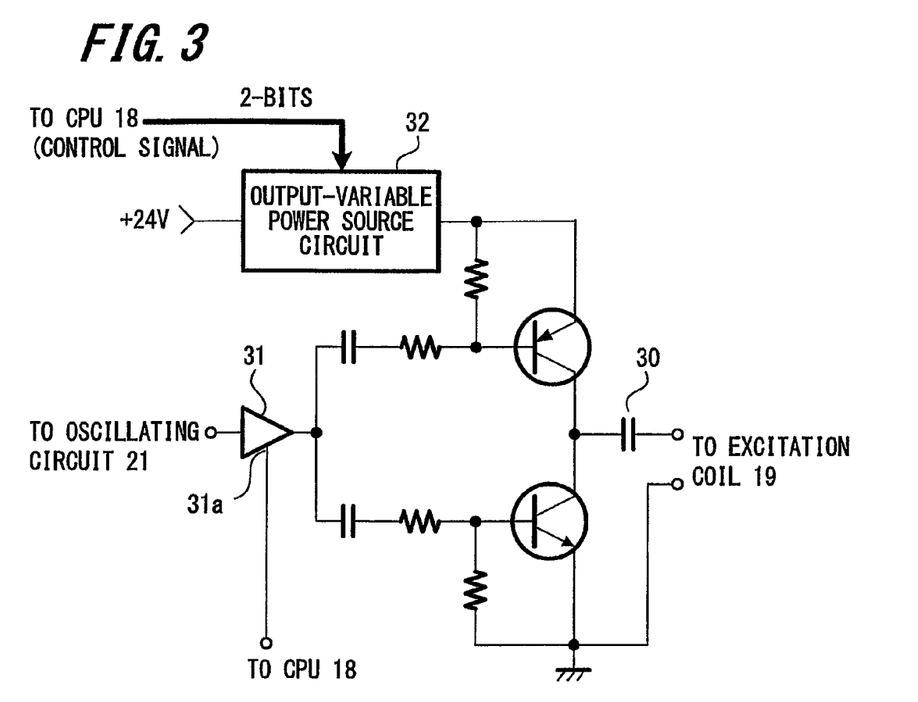
FIG. 3 is a circuit diagram showing an example of a drive circuit of the position detecting device of FIG. 1.

FIG. 3 shows one embodiment of a drive circuit 20. A capacitor 30 is connected to the excitation coil 19 so that a resonant circuit resonating at a frequency of $f_0$ is formed. Further, a three-state buffer 31 having a CMOS (Complementary Metal-Oxide Semiconductor) structure is provided to control the passage of the signal, which has a frequency of $f_0$, output from the oscillating circuit 21. Further, a control terminal 31a of the three-state buffer 31 is connected to the CPU 18, so that the signal supplied to the excitation coil 19 can be controlled ON or OFF.

Further, these circuitries are driven by a voltage supplied from a power supply circuit 32 whose output voltage is variable. The output voltage of the power supply circuit 32 varies in response to a control signal output from the CPU 18, the control signal being a 2-bit signal, for example. For example, the power supply circuit 32 can output the voltage in four preset levels ($V_0$ to $V_3$) within a range of 5V to 20V.

Figure 4:
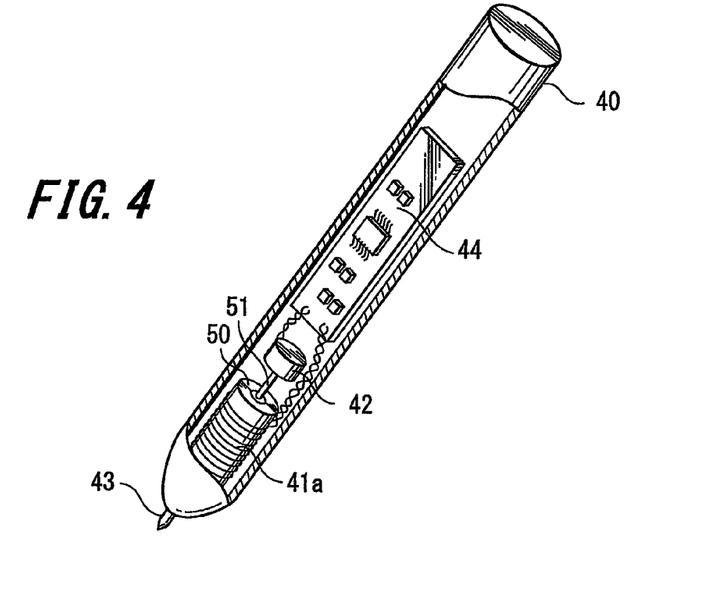
FIG. 4 is a view showing the configuration of a position indicator according to one embodiment of the present invention.

FIG. 4 shows one possible configuration of the position indicator 40 such as a stylus pen. A coil 41a wound around a hollow ferrite core 50 and a variable capacitor 42 whose capacitance changes according to pen pressure are provided inside the position indicator 40. Also provided inside the position indicator 40 is a rod 51 which passes through the ferrite core 50. The rod 51 has one end thereof providing a pen tip 43 and the other end thereof engaged with the variable capacitor 42. Further, an integrated circuit having a CMOS structure and peripheral components thereof (which will be described later with reference to FIG. 5) are mounted on a printed circuit board 44. With such a configuration, when the pen pressure is applied to the pen tip 43, the variable capacitor 42 is pushed by the rod 51, and therefore the capacitance of the variable capacitor 42 changes in accordance with the pen pressure.

Figure 5:
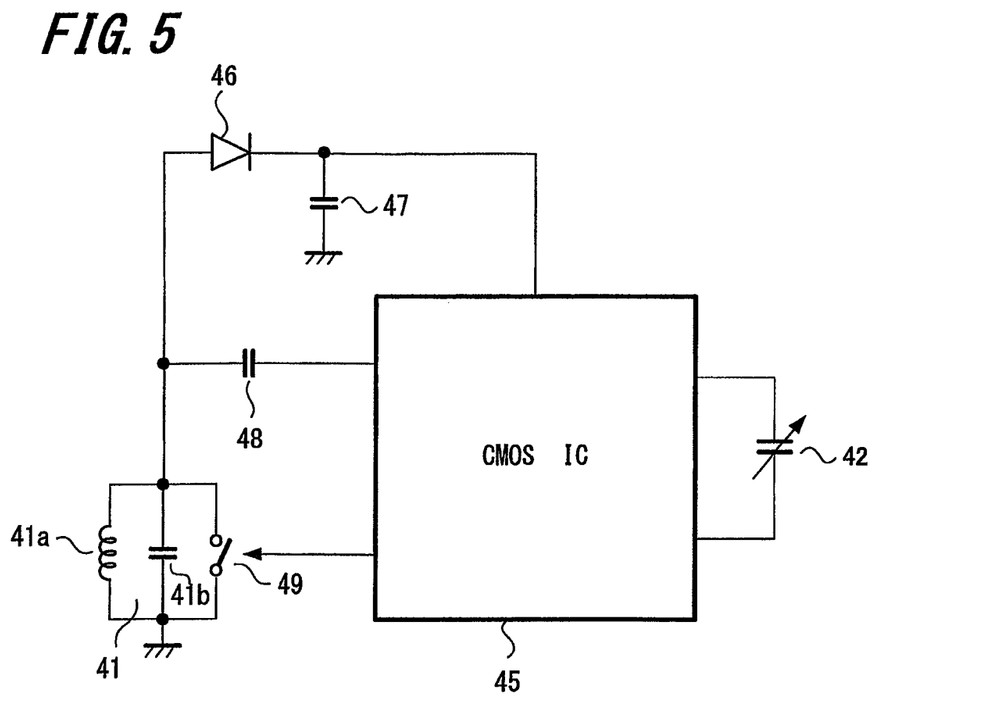
FIG. 5 is a circuit diagram of one embodiment of a position indicator of the present invention.

FIG. 5 schematically shows the electrical circuit of the position indicator 40 shown in FIG. 4. The coil 41a and a capacitor 41b form a resonant circuit 41 which resonates at the frequency $f_0$ transmitted from the excitation coil 19 of the tablet 10 (the position detecting device). Further, an integrated circuit 45 based on known CMOS technology is mounted on the printed circuit board 44 shown in FIG. 4. The integrated circuit 45 is driven by a driving power generated by a diode 46 and a capacitor 47.

The diode 46 is connected to the resonant circuit 41, and an AC voltage generated by the resonant circuit 41 based on the excitation signal supplied from the excitation coil 19 is rectified by the diode 46 and the capacitor 47 and converted into a DC voltage so as to serve as the driving power. Further, signals generated by the resonant circuit 41 are supplied to the integrated circuit 45 through a capacitor 48. Based on the signals supplied through the capacitor 48, the integrated circuit 45 generates clock signals for sending/receiving signals between the position indicator 40 and the tablet 10 and clock signals for detecting the pen pressure, which will be described later.

As described above, the capacitance of the variable capacitor 42 changes according to the pen pressure. The variable capacitor 42 is connected to a resistor (not shown) to form a time constant circuit, so that a time constant changes according to the capacitance of the variable capacitor 42, which changes according to the pen pressure. Further, the number of waves of the signal generated by the resonant circuit 41 is counted by the integrated circuit 45 in accordance with a time related to the time constant. For example, the waves may be counted for a period of time equal to the time constant or some fraction or multiple thereof. The counted wave value is converted to a value representing the pen pressure, the value being an 8-bit value, for example.

The pen pressure data obtained in such a manner is output from the integrated circuit 45 bit by bit in synchronization with the clock signals, which are provided for sending/receiving signals between the position indicator 40 and the tablet 10, to control a switch 49 connected in parallel to the resonant circuit 41. Thus, when the switch 49 is open, the position signal output from the position indicator 40 can be detected by the tablet 10; while when the switch 49 is closed, since the resonant circuit 41 is short-circuited, the position signal output from the position indicator 40 can not be detected.

Thus, in the tablet 10, information corresponding to the pen pressure can be obtained by detecting the signal transmitted from the position indicator 40 after excitation signals from the excitation coil 19 have been transmitted for a predetermined time. Since the operation of the position indicator 40 shown in FIG. 5 is disclosed in detail in Japanese Unexamined Patent Publication No. H07-175572, incorporated by reference above, the description thereof is omitted herein.

When the position indicator 40 configured in such a manner is located within the position detecting area on the tablet 10 shown in FIG. 1, the CPU 18 performs the operation of sending/receiving signals between the position indicator 40 and the tablet 10 for a plurality of loop coils of the X-axis loop coil group near the position where the position indicator 40 is located, and an X coordinate value of the indicated position of the position indicator 40 is obtained based on the distribution of signal levels detected by the aforesaid plurality of loop coils of the X-axis loop coil group.

Next, the CPU 18 performs the operation of sending/receiving signals between the position indicator 40 and the tablet 10 for a plurality of loop coils of the Y-axis loop coil group near the position where the position indicator 40 is located, and a Y coordinate value of the indicated position of the position indicator 40 is obtained based on the distribution of signal levels detected by the aforesaid plurality of loop coils of the Y-axis loop coil group. Such a method of detecting the coordinates is the same as that used in related apparatuses.

Further, in order to detect 8-bits of pen pressure data transmitted from the position indicator 40, after transmitting the excitation signals from the excitation coil 19 for a predetermined time (1 ms, for example), the CPU 18 continues the operation of sending/receiving signals between the position indicator 40 and the tablet 10 eight times in the same timing period when detecting the position (coordinates) of the position indicator 40. At this time, the selecting circuit 12 selects a loop coil (either in the X-axis direction or in the Y-axis direction) closest to the position indicator 40 and receives signals from the selected loop coil. The operation of detecting the pen pressure is also disclosed in detail in Japanese Unexamined Patent Publication No. H07-175572 incorporated by reference above.

Further, the CPU 18 repeats the operation of detecting the position (coordinates) and the operation of detecting the pen pressure, following the movement of the position indicator 40 on the position detecting area of the tablet 10. When the position indicator 40 is located near the center of the position detecting area, the strength of the excitation signal supplied from the excitation coil 19 to the resonant circuit 41 becomes the weakest. Thus, under the control of the CPU 18, a high output power is output from the drive circuit 20 of the tablet 10 so that the voltage of the driving power obtained by the diode 46 and the capacitor 47 of the position indicator 40 becomes high enough to drive the integrated circuit 45.

Figure 6:
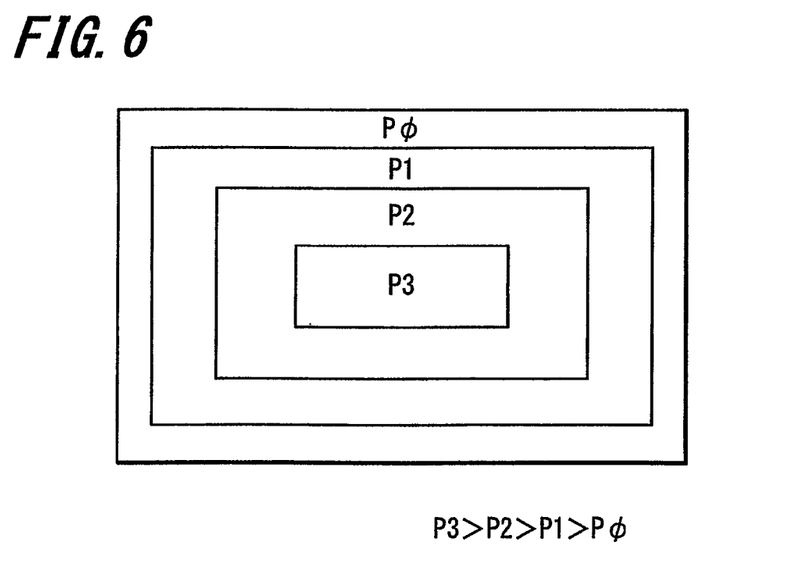
FIG. 6 is a view showing one possible relationship between an indicated position and a transmission power in accordance with the present invention.

FIG. 6 shows one possible relationship between the detected position indicated by the position indicator 40 and the power output from the drive circuit 20. As shown in FIG. 6, the transmission power is switched between four levels of PΦ, P1, P2, and P3 according to the distance between the position indicator and the surrounding coil of the position detecting device. The transmission power becomes higher when the position indicator 40 is located toward the center of the position detecting area than it is when the position indicator is located towards the peripheral portion of the position detecting area (specifically, P3>P2>P1>PΦ)). By supplying the control signal to the drive circuit 20 for controlling the power to be output from the drive circuit 20 according to the detected position (coordinates) indicated by the position indicator, the CPU 18 controls the excitation coil 19 so that the power consumption caused by energizing the excitation coil 19 is dynamically optimized, instead of becoming excessively high beyond necessity.

As described above, in the position detecting device according to one embodiment of the present invention, the power output from the surrounding coil of the position detecting device is dynamically controlled according to information obtained by analyzing the signal received from the position indicator, such as the indicated position of the position indicator and/or the magnitude or other signal characteristic of the AC signal received from the position indicator. The information used to control the power output from the surrounding coil may be related, for example, to the voltage of the driving power produced by the diode 46 and the capacitor 47 in the position indicator. Such information may then be encoded by the integrated circuit 45 in a manner similar to the pen pressure information, and transmitted to the position detecting device. Other information used to control the power output from the surrounding coil may be obtained by analyzing the signal from the position indicator for other characteristics, such as the relative phase or time delay between the excitation signals transmitted from the surrounding coil and the signals received from the position indicator. Because the excitation signal transmitted from the surrounding coil can be varied based on such information, the power consumption can be reduced to a lower level. Further, in the case where the present invention is applied to a mobile terminal such as a laptop computer, the battery life of the mobile terminal can be extended.

Incidentally, in the aforesaid example, although the transmission power is switched between four levels according to the distance between the position indicator and the surrounding coil of the position detecting device, the transmission power can be switched between more or fewer discrete levels. Further, the transmission power can be continuously changed also. The position detecting device can also have a configuration in which the power of the signal transmitted from the surrounding excitation coil is controlled such that the strength of the signal to be transmitted from the position indicator and detected by the position detecting device falls in a predetermined range.

Figure 7:
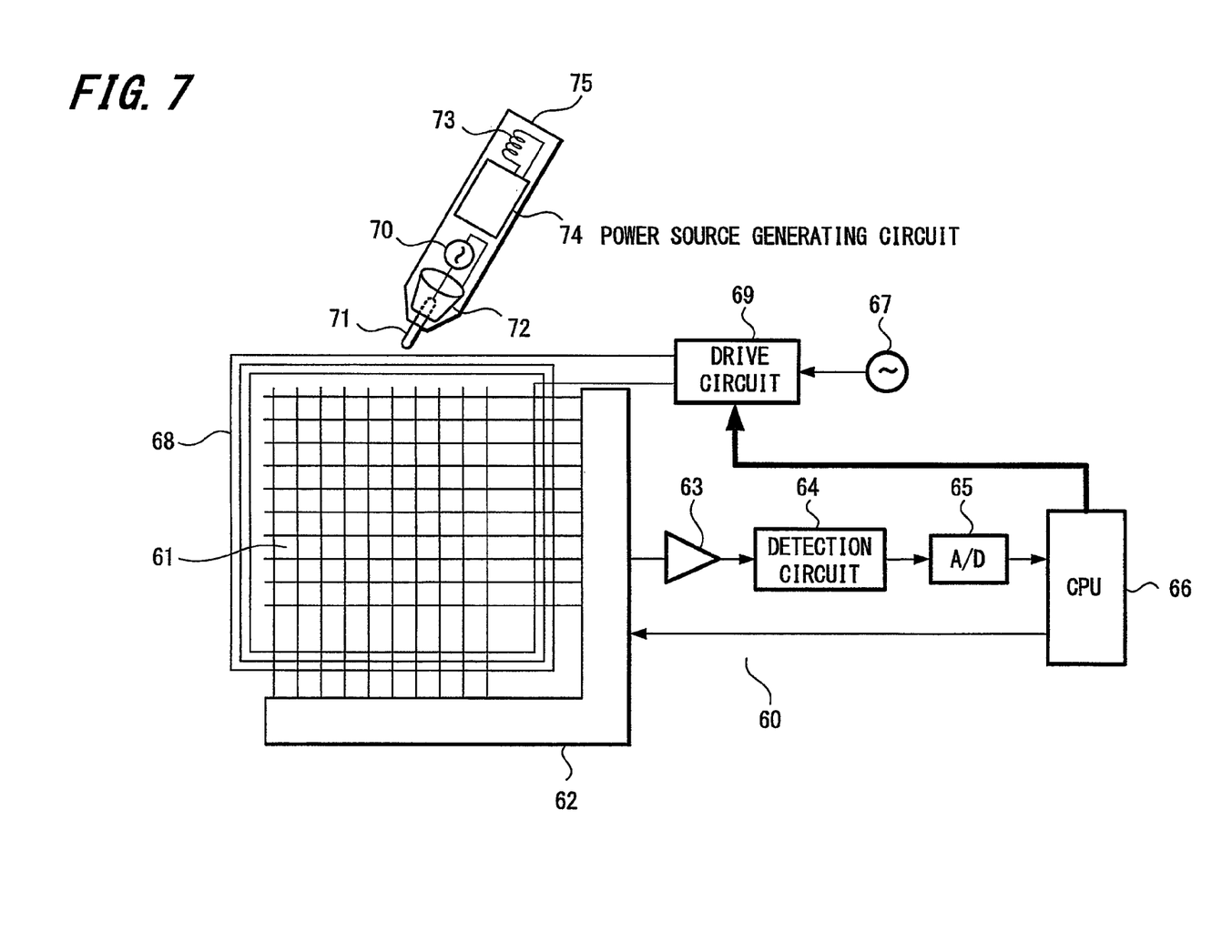
FIG. 7 is a diagram showing the configuration of the position detecting device according to yet another embodiment of the present invention.

FIG. 7 shows a configuration of a tablet 60 serving as the position detecting device according to an example of another embodiment of the present invention. In this example, a signal of a high-frequency electric field is transmitted from a position indicator.

As shown in FIG. 7, in the tablet 60, a plurality of sense lines forming a sense line group 61 for detecting the high-frequency electric field radiated from a position indicator 75, which will be described later, are arranged longitudinally and crosswise at a predetermined interval. The sense line group 61 is connected to a selecting circuit 62. A desired sense line is selected from the sense line group 61 to be connected to an amplifying circuit 63. The output of the amplifying circuit 63 is supplied to a detection circuit 64. The output of the detection circuit 64 is supplied to an A/D conversion circuit 65. The output of the A/D conversion circuit 65 is supplied to a CPU 66. Further, a switching signal for selecting the desired sense line from the sense line group 61 is supplied from the CPU 66 to the selecting circuit 62.

An excitation coil 68 is provided to surround the sense line group 61. Further, an oscillating signal generated by an oscillator 67 is supplied to the excitation coil 68 through a drive circuit 69. A control signal is supplied from the CPU 66 to the drive circuit 69, so that the strength of the excitation signal from the excitation coil 68 can be changed. Incidentally, the configuration of the drive circuit 69 may be the same as that of the previously described embodiment.

The configuration of the position indicator 75 will be described below. An oscillator 70 is connected to two electrodes 71 and 72. The excitation signal transmitted from the excitation coil 68 is received by a coil 73 and a power generating circuit 74, to generate driving power. The oscillator 70 is driven by the driving power generated by the power generating circuit 74.

The operation of the tablet 60 serving as the position detecting device and the position indicator 75 having the aforesaid configurations will be described below. Here, suppose that the position indicator 75 is located within the position detecting area of the tablet 60. A high-frequency magnetic field serving as an excitation signal is transmitted from the excitation coil 68 through the drive circuit 69. Therefore, a high-frequency signal is induced in the coil 73 of the position indicator 75, and as a result, the driving power is obtained by the power generating circuit 74.

The oscillator 70 is driven by this driving power, and a high-frequency electric field is radiated from the two electrodes 71 and 72. In the tablet 60, the sense lines are sequentially switched by the selecting circuit 62, and the signal levels thereof are respectively detected. The coordinates of the position indicator 75 are obtained based on the distribution of the signal levels detected by the sense lines.

In a manner similar to the previously disclosed embodiment, when the position indicator 75 is located near the center of the position detecting area, the strength of the signal transmitted from the excitation coil 68 to be received by the coil 73 becomes the weakest. Therefore, the drive circuit 69 of the tablet 60 is controlled, based on the control signal from the CPU 66, so that the power of the signal supplied from the drive circuit 69 to the excitation coil 68 is varied to make the power generating circuit 74 of the position indicator 75 generate a desired driving voltage.

In a manner like that of the previously described embodiment, the CPU 66 supplies a power-controlling signal to the drive circuit 69 according to information obtained by analyzing the signal received from the position indicator 75, such as the indicated position (coordinates) of the position indicator 75 and/or the magnitude or other signal characteristic of the signal received from the position indicator 75, to optimally control the power of the signal output from the excitation coil 68.

As described above, with the position detecting device according to various exemplary embodiments of the present invention, the driving power for driving the circuitries provided inside the position indicator is obtained from the excitation coil arranged to surround the periphery of the position detecting area of the position detecting device, and further, the power of the excitation signal transmitted from the excitation coil can be dynamically controlled according to information obtained by analyzing the signal received from the position indicator, for example, the indicated position of the position indicator on the position detecting area. With such a configuration, it is not necessary to transmit a driving signal for driving the circuitries inside the position indicator from the sensor coils (or a sensor pattern) provided in the position detecting area of the position detecting device that are configured to detect the signal from the position indicator. Thus, a transparent electrode by means of an ITO film (Indium Tin Oxide film) or other substantially transparent conductor formed on a glass surface can be used to provide the sensor pattern for the purpose of achieving the function of detecting the signal from the position indicator. Therefore, the sensor coils (or the sensor pattern) of the position detecting device can be arranged on the front surface of a liquid crystal panel so as to satisfactorily detect the position of the position indicator.

Further, in the position indicator, since the driving power is obtained from the excitation signal supplied by the surrounding coil, it is not necessary to install a battery or the like in the position indicator as a source of driving power.

Further, since the power of the signal transmitted from the surrounding coil is controlled according to information obtained by analyzing the signal received from the position indicator, for example, the indicated position of the position indicator, the power of the signal transmitted from the surrounding coil can be dynamically varied. As a result, the power consumption can be reduced to a lower level. Further, in the case where the present invention is applied to a mobile terminal, the battery life of the mobile terminal can be extended.

In accordance with yet another aspect of the present invention, instructions for operating the CPU to control the power supplied to the excitation coil surrounding the position detecting area may be stored on a computer readable media such as a CD, hard drive, solid state memory, USB memory stick, or other device that can be read by the CPU. In operation, the CPU reads the instructions and adjusts the power of the signals supplied to the excitation coil in accordance with information determined by analyzing the signal received from the position indicator.

It should be noted that the present invention is not limited to the above embodiments but includes various modifications.

For example, the present invention includes a configuration in which a position indicator holder formed integrally with or separately from the tablet is provided, and the output of the excitation signal to the position indicator can be switched depending on whether or not the position indicator is placed on the position indicator holder. In order to detect whether or not the position indicator is placed on the position indicator holder, the position indicator holder is provided with a sensor, such as an optical sensor, for detecting whether or not the position indicator is placed on the position indicator holder. Further, the position indicator holder is provided with an excitation coil having the same function as that of the aforesaid excitation coil for supplying the drive signal to drive the circuitries inside the position indicator.

The driving power is supplied to the optical sensor and the excitation coil of the position indicator from the tablet. A signal for indicating whether or not the position indicator is placed on the position indicator holder is supplied from the optical sensor to the CPU inside the tablet. Further, based on an instruction of the CPU, a signal for excitation is provided to the excitation coil of the position indicator holder. When the signal received from the optical sensor shows the position indicator has been placed on the position indicator holder, the CPU selects the excitation coil of the position indicator holder (instead of selecting the excitation coil surrounding the periphery of the position detecting area of the tablet) and supplies power to a power supply circuit for driving the circuitries of the position indicator on the position indicator holder. On the other hand, when the CPU recognizes that the position indicator is picked up from the position indicator holder, the CPU enables the excitation coil surrounding the periphery of the position detecting area of the tablet, instead of enabling the excitation coil of the position indicator holder. Thus, when an electric storage circuit, such as a capacitor, is provided in the power supply circuit for driving the circuitries provided inside the position indicator, the power supply circuit for driving the circuitries inside the position indicator will stay in an active state even at the time when the position indicator is picked up from the position indicator holder, and therefore the position indicator can be immediately used.

What is claimed is:

1. A position detecting device defining a position detecting area, for use with a position indicator, to detect a position indicated by the position indicator on the position detecting area, comprising:
    an excitation coil arranged to surround a periphery of the position detecting area to supply an excitation signal to the position indicator;
    a sensor configured to detect a signal transmitted from the position indicator based on the excitation signal supplied to the position indicator from the excitation coil, to thereby detect a position indicated by the position indicator on the position detecting area; and
    a controller configured to control a signal level of the excitation signal supplied from the excitation coil to the position indicator based on the detected position indicated by the position indicator.

2. The position detecting device according to claim 1, wherein the controller is configured to control the signal level of the excitation signal supplied from the excitation coil based additionally on a strength of the signal transmitted from the position indicator and detected by the sensor.

3. The position detecting device according to claim 1,
    wherein the position indicator is provided with a resonant circuit including a coil and a capacitor,
    wherein a signal induced in the resonant circuit based on the excitation signal supplied from the excitation coil and transmitted from the resonant circuit is detected as the signal from the position indicator, and wherein the controller is configured to control the signal level of the excitation signal supplied from the excitation coil such that a level of the signal transmitted from the position indicator and detected by the sensor falls within a predetermined range.

4. A position detecting device defining a position detecting area, for use with a position indicator, to detect a position indicated by the position indicator on the position detecting area, comprising:
- a sensor configured to be arranged on a front surface of a liquid crystal display device to detect a signal transmitted from the position indicator to thereby detect a position indicated by the position indicator on the position detecting area, which is defined relative to the liquid crystal display device;
- an excitation coil arranged to surround a periphery of the position detecting area to supply driving power to circuitry of the position indicator; and
- a controller configured to dynamically control a power level of a signal supplied to the excitation coil based on the detected position indicated by the position indicator.

5. The position detecting device of claim 4, wherein the controller is configured to control the power level of the signal supplied to the excitation coil based additionally on a strength of the signal transmitted from the position indicator and detected by the sensor.

6. The position detecting device according to claim 4, wherein the position indicator is provided with a resonant circuit for receiving an excitation signal from the excitation coil, and the driving power is generated in the position indicator based on an AC voltage output from the resonant circuit.

7. The position detecting device according to claim 6, wherein the position indicator is provided with a diode and a capacitor for generating the driving power, and the driving power is generated by rectifying the AC voltage output from the resonant circuit to obtain a DC voltage and storing the obtained DC voltage.

8. The position detecting device according to claim 6, wherein the position indicator is included in a pen, and wherein:
- the position indicator is provided with a variable capacitor whose capacitance changes according to a pen pressure applied to a pen tip of the position indicator, and
- the pen pressure applied to the position indicator is detected based on a change in the capacitance of the variable capacitor.

9. The position detecting device according to claim 4,
wherein the position indicator is provided with a coil, for receiving an excitation signal from the excitation coil, and an oscillator, and
wherein the position indicated by the position indicator on the position detecting area is detected by driving the oscillator provided in the position indicator based on the excitation signal supplied from the excitation coil and received by the coil, and detecting a high-frequency signal output from the oscillator with the sensor based on the interaction between the position indicator and the sensor.

10. A method of controlling power usage in a device that includes a position detecting device for detecting a position indicated by a position indicator on a position detecting area of the position detecting device, comprising:
- supplying an excitation signal to the position indicator with an excitation coil provided to surround a periphery of the position detecting area of the position detecting device;
- detecting, in the position detecting area, an AC signal transmitted from the position indicator based on the excitation signal supplied from the excitation coil;
- detecting a position indicated by the position indicator on the position detecting area based on the detected AC signal transmitted from the position indicator; and
- controlling a strength of the excitation signal supplied from the excitation coil, based on the detected position indicated by the position indicator.

11. The method according to claim 10, wherein the strength of the excitation signal supplied from the excitation coil is controlled based additionally on a strength of the detected AC signal transmitted from the position indicator.

12. The method according to claim 10,
wherein the position indicator is provided with a resonant circuit including a coil and a capacitor,
wherein, in the detecting of the AC signal, a signal induced in the resonant circuit based on the excitation signal supplied from the excitation coil and transmitted from the resonance circuit is detected as the AC signal from the position indicator, and
wherein, in the controlling, the excitation signal supplied from the excitation coil is controlled such that a voltage level of the AC signal transmitted from the position indicator and detected in the position detecting area falls within a predetermined range.

13. A position detecting method for detecting a position indicated by a position indicator on a position detecting area of a position detecting device, comprising:
- detecting the position indicated by the position indicator on the position detecting area of the position detecting device with a sensor arranged on a front surface of a liquid crystal display device, the position detecting area being defined relative to the liquid crystal display device;
- supplying driving power to circuitry provided in the position indicator with an excitation coil that surrounds a periphery of the position detecting area of the position detecting device; and
- dynamically controlling a power level of a signal supplied to the excitation coil based on the detected position indicated by the position indicator on the position detecting area.

14. The position detecting method according to claim 13, wherein the position indicator is provided with a resonant circuit for receiving an excitation signal from the excitation coil, and the driving power is generated in the position indicator based on an AC voltage output from the resonant circuit.

15. The position detecting method according to claim 14, wherein the position indicator is provided with a diode and a capacitor for generating the driving power, and the driving power is generated by rectifying the AC voltage output from the resonant circuit to obtain a DC voltage and storing the obtained DC voltage.

16. The position detecting method according to claim 13,
wherein the position indicator is provided with a coil, for receiving an excitation signal from the excitation coil, and an oscillator, and
wherein the position indicated by the position indicator on the position detecting area is detected by driving the oscillator provided in the position indicator based on the excitation signal supplied from the excitation coil and received by the coil, and detecting a high-frequency signal output from the oscillator with the sensor, based on the interaction between the position indicator and the sensor.

17. The position detecting device according to claim 1, wherein the controller is configured to control the signal level of the excitation signal supplied from the excitation coil such that a level of the signal transmitted from the position indicator and detected by the sensor falls within a predetermined range.

18. The position detecting device according to claim 1, wherein the controller is configured to control the signal level of the excitation signal supplied from the excitation coil correspondingly to a distance between the detected position indicated by the position indicator and the excitation coil that is arranged to surround the periphery of the position detecting area.

19. The position detecting device according to claim 1, wherein the position indicator includes a resonant circuit comprising a coil and a capacitor, and the sensor is configured to detect the position indicated by the position indicator by detecting a signal from the resonant circuit.

20. The position detecting device according to claim 1, wherein the position indicator includes a pair of electrodes for radiating a high-frequency electric field, and the sensor is configured to detect the position indicated by the position indicator by detecting the high-frequency electric field radiated from by the pair of electrodes.

21. The position detecting device according to claim 1, wherein the position detecting area is formed as a transparent area and is arranged on a front surface of a display panel of a display device.

\* \* \* \* \*